(12) United States Patent
Manzo

(10) Patent No.: US 11,542,394 B2
(45) Date of Patent: Jan. 3, 2023

(54) MICROLASERS BASED DYE DOPED POLYMERIC RESONATORS FOR BRAIN ACTIVITY STIMULATION AND MONITORING

(71) Applicant: UNIVERSITY OF NORTH TEXAS, Denton, TX (US)

(72) Inventor: Maurizio Manzo, Denton, TX (US)

(73) Assignee: UNIVERSITY OF NORTH TEXAS, Denton, TX (US)

( * ) Notice: Subject to any disclaimer, the term of this patent is extended or adjusted under 35 U.S.C. 154(b) by 764 days.

(21) Appl. No.: 16/550,962

(22) Filed: Aug. 26, 2019

(65) Prior Publication Data

US 2020/0062963 A1 Feb. 27, 2020

Related U.S. Application Data

(60) Provisional application No. 62/722,572, filed on Aug. 24, 2018.

(51) Int. Cl.
| | | |
|---|---|---|
| *C09B 23/16* | (2006.01) | |
| *C08K 3/08* | (2006.01) | |
| *C08K 5/00* | (2006.01) | |
| *C08K 5/3417* | (2006.01) | |
| *C08L 75/04* | (2006.01) | |
| *C08L 33/08* | (2006.01) | |
| *C08L 33/26* | (2006.01) | |
| *B01L 3/00* | (2006.01) | |
| *C08L 83/04* | (2006.01) | |

(52) U.S. Cl.
CPC ........ *C09B 23/16* (2013.01); *B01L 3/502784* (2013.01); *C08K 3/08* (2013.01); *C08K 5/0041* (2013.01); *C08K 5/3417* (2013.01); *C08L 33/08* (2013.01); *C08L 33/26* (2013.01); *C08L 75/04* (2013.01); *C08L 83/04* (2013.01); *C08K 2003/0831* (2013.01); *C08K 2201/011* (2013.01); *C08L 2207/53* (2013.01)

(58) Field of Classification Search
CPC ........................... B01L 3/502784; C09B 23/16
See application file for complete search history.

*Primary Examiner* — Wenwen Cai

(74) *Attorney, Agent, or Firm* — Thomas |Horstemeyer, LLP

(57) ABSTRACT

Microlaser based dye doped polymeric resonators are provided as well as pharmaceutical formulations containing the microlaser based dye doped polymeric resonators, methods of making thereof, and methods of use thereof for monitoring and/or stimulating electrical activity in a brain of a subject in need thereof. The microlaser based dye doped polymeric resonators can include a particle having a spherical core containing one or more fluorescent dyes dispersed within a polymer matrix, wherein the polymer matrix has an index of refraction of about 1.2 or greater; an outer surface surrounding the spherical core; and a gold nanoparticle, wherein the gold nanoparticle is on the outer surface, is dispersed within the spherical core, or both. The fluorescent dyes can include a voltage sensitive fluorescent dye.

20 Claims, 19 Drawing Sheets

MICROLASERS BASED DYE DOPED POLYMERIC RESONATORS FOR BRAIN ACTIVITY STIMULATION AND MONITORING

CROSS-REFERENCE TO RELATED APPLICATIONS

This application claims priority to, and the benefit of, co-pending U.S. provisional application entitled "MICROLASERS BASED DYE DOPED POLYMERIC RESONATORS FOR BRAIN ACTIVITY STIMULATION AND MONITORING" having Ser. No. 62/722,572, filed Aug. 24, 2018, the contents of which are incorporated by reference in their entirety.

BACKGROUND

Different pathologies such as Alzheimer's, Parkinson's, Wilson's diseases, and chronic traumatic encephalopathy due to blasts and impacts affect the brain functions altering the neuronal electrical activity. An important aspect of the brain study is the use of non-invasive, non-surgical methodologies that are suitable to the well-being of the patients. Brain activities are characterized by chemical and electrical processes, which happen at a fast rate within the skull. Only a portion of the electromagnetic field can be detected by applying sensors outside the scalp; in addition, surgery is often involved if sensors are applied in the subcutaneous region of the skull. For these reasons, sensors that can go behind the scalp without surgical procedures are needed to fully comprehend the phenomena involved into different pathologies affecting the brain.

Currently, the brain activity is monitored, for example, by using machines such as the electroencephalograph (EEG), where electrodes applied to the scalp measure the electric field generated by the activity of the brain. This method exhibits a poor spatial resolution, can cause discomfort to the patient and presents a low level of signal-noise (A. K. Maddirala, et al., IEEE Sensors Journal, vol. 16, 23, 2016). Other techniques such as functional magnetic resonance imaging (fMRI), and magnetoencephalography (MEG), are very expensive and they do not allow the patient to move during the scanning process (Z. Liu, et al., IEEE engineering in medicine and biology magazine, Vol. 25, 4, 2006).

Optical techniques applied to biomedical research and diagnostics have been spread during the last decades. Techniques such as optical coherent tomography (OCT), exhibit high resolution (~15 μm) and a depth of ~2 mm (J. Welzel, Non Invasive Diagnostic Techniques in Clinical Dermatology, Springer, Berlin, Heidelberg, 2014), and is used for biomedical diagnostic of skin layers, mucous membranes and blood vessels. The OTC is used specially to detect and diagnose some types of cancers (T. Freddy, et al., *Cancer Research*, Vol. 69, 22, 2009). Near infrared light (NIR) of spectral range goes from 800 nm to 1300 nm, it is a harmless radiation for the living tissue, and can penetrate the living matter in depth as, it turns out that most of the living matter is transparent to the NIR light. For example, functional near infrared (fNIR) spectroscopy has been employed to monitor cerebral hemodynamics in the prefrontal cortex in patients exposed to different stimuli. However, the change of the blood flow associated with the neuronal activity is slow, which in turn makes this method not suitable to detect neuronal activity where high temporal resolution is often needed.

Also, voltage sensitive dyes have been used to detect electrical activities from neuronal cells, both in vitro and in vivo (D. Shoham, et al., Neuron, Vol. 24, 4, 1999.). The emission spectra of these dyes change with a variation of electrical potential. However, the quantity of dye required to have a detectable signal from the emitted fluorophores is not safe if used for a living biological entity; in addition, the development of complex algorithms is required to mitigate the background noise and reach a clear signal.

There remains a need for improved methods that can be employed to detect the brain activity (i.e. neuronal electric signals) efficiently and with high level-noise ratio. There remains a need for methods and techniques that measures electric signals directly from within the neurons with high spatial and temporal resolutions, and high level to noise ratio. Furthermore, there remains a need for improved tools and methods for direct measurement and/or stimulation of neuronal electric activity without surgical operations that overcome the aforementioned deficiencies.

SUMMARY

In various aspects, a brain/machine interface (BMI) is provided based on an injectable neurotransducer containing optical neuron stimulation and recording molecules mixed with metal nanoparticle in a whispering gallery mode (WGM) dielectric cavity amplifier. This neurotransducer can replace current methods that rely on highly invasive surgically-implanted electrodes or bulky, low-resolution EEG and fMRI machines, which are not usable by healthy military personnel in non-laboratory environments. In some aspects, the approach uses the light-activated and light-emitting Akita molecules to record from and stimulate neurons using long-wavelength light that can penetrate significant thicknesses of tissue and bone, attached to and within an injectable optical amplifier. The metal nanoparticle/WGM amplifier allows small signals to and from neurons to be boosted to levels compatible with compact hardware located outside the user's head that generate the optical neuron stimulating signals, detect the optical output of the neural membrane voltage-sensitive fluorescent probes, and/or perform multiplexing and signal processing operations. In some aspects, the neurotransducer particles can be targeted to specific types of neurons using a cell-surface recognition ligand covalently connected to the neurotransducer particles. In some aspects, stimulating and recording from neurons thru the blood/brain barrier is achieved using the evanescent electric fields of neurons for sensing/recording across the BBB. In some aspects, stimulating and recording from neurons thru the blood/brain barrier is achieved using sonoporation to allow the particles to penetrate the BBB and directly contact neurons. In some aspects, the particles use dyes that absorb light near 800 nm and fluoresce over 1000 nm where tissue light absorption and scattering are minimized, thereby increasing the wavelength of stimulating and recording light to and from neurons to achieve higher penetration of skull and brain tissue. In some aspects, the optical resonator design and biocompatible resonator microparticle assembly techniques allow for boosting neuron stimulation and recording optical signals to levels usable by compact hardware located outside the head. In some aspects, methods are provided to write to and read from neurons at a high speed and with good fidelity and privacy.

In some aspects, a particle is provided having (i) a spherical core containing one or more fluorescent dyes dispersed within a polymer matrix, wherein the polymer matrix has an index of refraction of about 1.2 or greater; (ii) an outer surface surrounding the spherical core; and (iii) a gold nanoparticle, wherein the gold nanoparticle is on the outer surface, is dispersed within the spherical core, or both. In some aspects, the one or more fluorescent dyes include a voltage sensitive fluorescent dye. In some aspects, the one or more fluorescent dyes include both a voltage sensitive fluorescent dye (for recording or monitoring electrical activity) and a dye that has little or no voltage sensitivity (for providing electrical stimulation).

In some aspects, the voltage sensitive fluorescent dye is selected from the group consisting of a carbocyanine dye, a rhodamine dye, an oxonol dye, a merocyanine dye, and a combination thereof. In some aspects, the voltage sensitive dye has a structure according to one of the following formulas

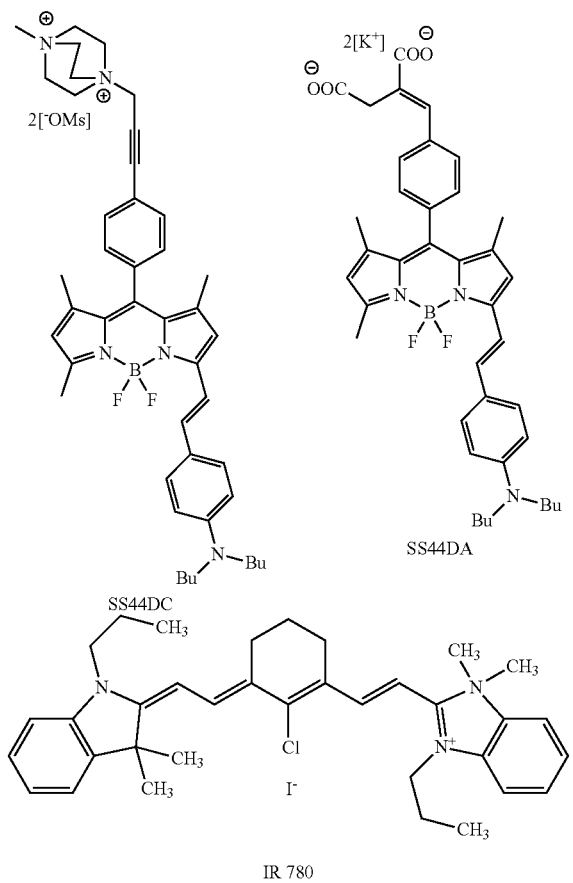

In some aspects, the polymer matrix includes a polymer selected from the group consisting of an epoxy, a urethane, a silicone, an acrylic, a cyanoacrylate, and a combination thereof. In some aspects, the the polymer matrix is a UV curable polymer matrix. In some aspects, the polymer matrix is biocompatible. Biocompatible polymers can include polyalkylene glycols such as poly(ethylene glycol), biocompatible aliphatic polyesters such as poly(lactic acid) and poly(glycolic acid), and copolymers thereof.

In some aspects, a ratio (v/v) of an amount of the voltage sensitive fluorescent dye to an amount of the polymer matrix is about 2 to about 6. In some aspects, the particle exhibits a shift of a laser mode of the particle when exposed to an electric field due to a change in the refractive index of the VSD used, wherein the shift is about 0.05 nm to about 0.2 nm for an electric field strength of about 50 V/m to about 200 V/m. In some aspects, the particle exhibits a variation of an amplitude of a laser mode of the particle when exposed to an electric field, wherein the variation of the amplitude is about 5% to about 50% for an electric field strength of about 50 V/m to about 200 V/m.

In some aspects, the gold nanoparticles are selected from the group consisting of spherical gold nanoparticles having a diameter of about 100 nm to about 200 nm, gold nanorods having a diameter of about 5 nm to about 25 nm, and a combination thereof. In some aspects, the particle has a diameter of about 1 μm to about 10 μm. In some aspects, the particle further comprises a polymer shell encapsulating the spherical core. In some aspects, the gold nanoparticles are in the polymer shell. In some aspects, the polymer shell comprises a polymer selected from the group consisting of an epoxy, a urethane, a silicone, an acrylic, a cyanoacrylate, and a combination thereof. In some aspects, the polymer shell includes a biocompatible polymer such as those described herein.

In some aspects, a method of making particles is provided. The method can include (i) providing an inner fluid comprising a voltage sensitive dye, a gold nanoparticle, a polymeric precursor, and a polymerization initiator; (ii) contacting the inner fluid with a middle fluid via a microfluidic droplet generator to generate a droplet comprising the inner fluid, wherein the droplet is dispersed within the middle fluid; and (iii) initiating polymerization of the polymeric precursor by applying one or both of heat and light to form the particle.

In some aspects, the middle fluid includes a second polymeric precursor and a second polymerization initiator; and the method further include, prior to initiating polymerization, contacting the droplet dispersed within the middle fluid with an outer fluid to form the droplet comprising the inner fluid surrounded by the middle fluid; and wherein initiating polymerization comprising initiating polymerization of both the polymeric precursor and the second polymeric precursor to form the particle having a polymer shell encapsulating the spherical core.

In some aspects, a method of making particles is provided. The method can include (i) providing an inner fluid comprising a voltage sensitive dye, a polymeric precursor, and a polymerization initiator; (ii) contacting the inner fluid with a middle fluid via a microfluidic droplet generator to generate a droplet comprising the inner fluid, wherein the droplet comprises an outer surface and is dispersed within the middle fluid, and wherein the middle fluid comprises a gold nanoparticle and the gold nanoparticle is on the outer surface of the droplet; and (iii) initiating polymerization of the polymeric precursor by applying one or both of heat and light to form the particle having the gold nanoparticle on the outer surface.

The method can include isolating the particle having the gold nanoparticle on the outer surface; providing a second inner fluid comprising a second polymeric precursor and the particle having the gold nanoparticle on the outer surface; contacting the second inner fluid with an outer fluid via a microfluidic droplet generator to generate a second droplet comprising the particle having the gold nanoparticle on the outer surface and surrounded by a layer of the second polymeric precursor, wherein the second droplet is dispersed within the outer fluid; and initiating polymerization of the second polymeric precursor by applying one or both of heat and light to form the particle further comprising a polymer shell formed from the polymerization of the second polymeric precursor.

Pharmaceutical formulations including the particles are provided. Methods of monitoring and/or stimulating electrical activity in a brain of a subject are also provided. The methods can include administering a plurality of particles or a pharmaceutical formulation described herein to the subject; detecting an optical signal external to the subject, wherein the optical signal is a fluorescence emission from the voltage sensitive fluorescent dye that is indicative of a level of electrical activity in a location of the brain near a particle in the plurality of particles.

The methods can include administering a plurality of particles or a pharmaceutical formulation described herein to the subject; and administering an optical signal to a location of the brain of the subject using an optical source external to the subject; wherein the optical signal stimulates the voltage sensitive fluorescent dye in a particle in the plurality of particles in the location of the brain of the subject, thereby stimulating an electrical activity in the location.

The location in the brain can be a single neuron or a cluster of neurons. In some aspects, the subject is a mammal, e.g. a human. In some aspects, the optical signal has a wavelength of about 750 nm to about 2000 nm.

Other systems, methods, features, and advantages of the microlasers based dye doped polymeric resonator particles, formulation thereof, methods of making thereof, and methods of use thereof will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Further aspects of the present disclosure will be readily appreciated upon review of the detailed description of its various embodiments, described below, when taken in conjunction with the accompanying drawings.

DETAILED DESCRIPTION

In various aspects, microlasers based dye doped polymeric resonator particles, formulation thereof, methods of making thereof, and methods of use thereof are provided that overcome one or more of the aforementioned deficiencies. The compositions and methods allow for a human brain-machine interface, capable of stimulating and reading single neuronal activity with high spatial and temporal resolution. Injectable neurotransducers, designed such that only specific neurons are targeted after delivery to the brain are provided, as well as methods of use in animals and humans.

Brain activity involves fast chemical and electrical processes within the skull. Only a portion of the resulting electromagnetic field can be detected with sensors outside the scalp (by EEG or MEG); sensitive and high-resolution reading and writing typically requires surgery for implantation of electrodes, optical fibers, or canulae [1-4]. For these reasons, transducers that can access the brain without surgical procedures are required to allow healthy people to use next generation human-machine neuronal interfaces.

Optical techniques have been widely applied in biomedical research and diagnostics in the past decade. Neurons respond to light both with and without optogenetic modification, and both small-molecule and genetically-engineered protein fluorophores have been used to read neuron activity with high spatial and temporal resolution [5-10]. Without surgical implantation of optical fibers, these techniques require more sensitive optical detection methods and better light penetration of tissue and skull than is possible with light of wavelength <1000 nm.

Additional considerations are the requirement for genetic modification of organisms to use optogenetic approaches (unlikely to be acceptable to healthy individuals) and the requirement to limit light intensity used for excitation of or reading from neurons to avoid tissue damage from photolysis or temperature increases. Moreover, bulky or motion-limiting equipment should not be required in a system designed for healthy people in routine situations.

Neurotransducers are provided based on injectable microparticles that function as optical microlasers, which will serve both to amplify the signal from small molecule voltage sensing fluorophores and to amplify neuron-stimulating light originating outside the skull.

In some aspects, injectable devices are provided to interface with neurons and demonstrate excitation ("writing") and sensory detection ("reading") in a closed loop.

Figure 1:
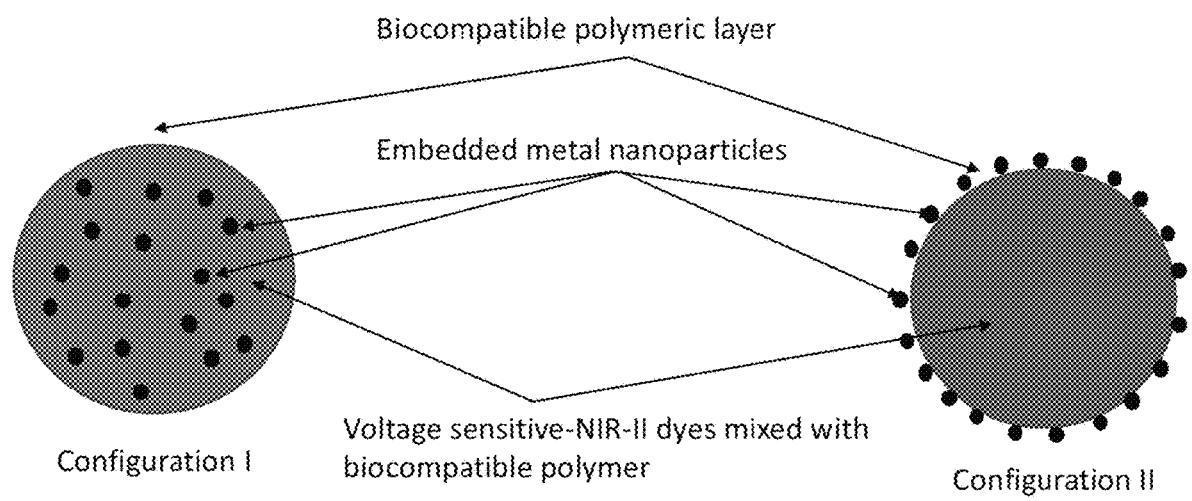
FIG. 1 is a schematic representation of two exemplary dye doped polymeric resonators having nanoparticles embedded within the inner core (Configuration I, left side) and with the nanoparticles between the dye doped inner core and a layer of only polymeric material (Configuration II, right side).

In various aspects, a sensor concept is provided based on the whispering gallery mode (WGM) phenomenon. The sensing element is a micro-dielectric particle with a metal core; the particle's outer layers are doped with fluorescent material and nanogold particles (see FIG. 1). When the particle is optically excited, the fluorescence of the dye couples with the optical modes (WGM); the optical modes can be observed as sharp peaks through the emitted light. In addition, nanogold particles, which emit photons when excited at the right wavelength (plasmonic effect) will increase the amplitude of dye emission, which in turn will result in a lower lasing threshold energy and more stability in the amplitude of the laser modes (WGMs). In other words, the particle is a tiny laser and the amplitude of these peaks depends on the emitted spectrum from the laser dye used and the size of the nanogold particles.

Figure 2:
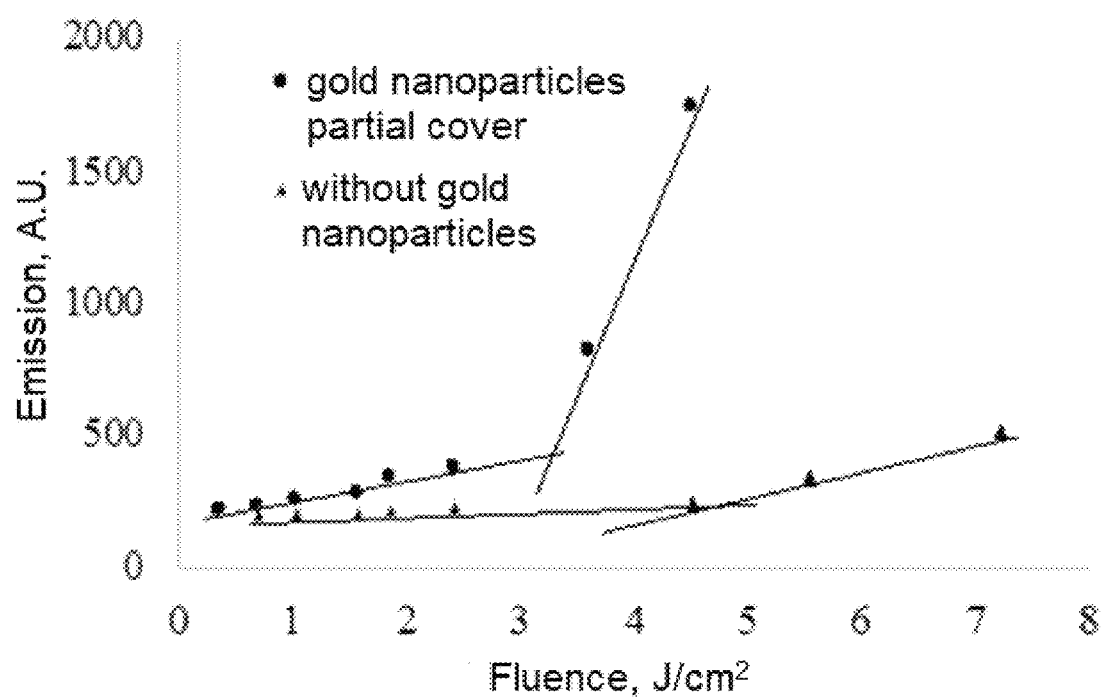
FIG. 2 is a graph of the emission as a function of fluence comparing the lasing threshold: microlaser with gold nanoparticles vs microlaser with no gold nanoparticles.
Figure 3:
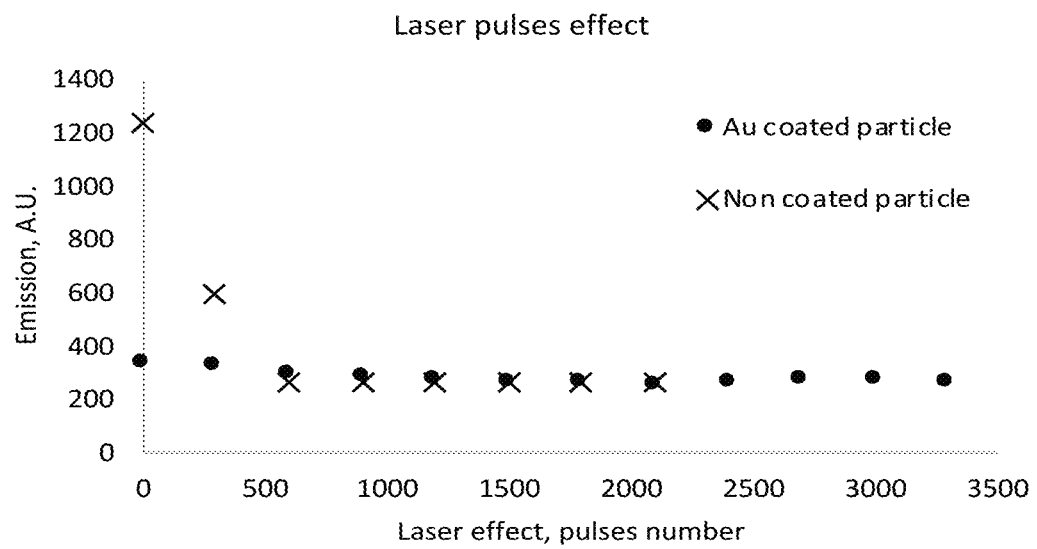
FIG. 3 is a graph of the laser mode emission as function of the excitation laser beam number of pulses: Au (gold nanoparticles) coated particle (microlaser) and non-coated particle (microlaser).
Figure 4:
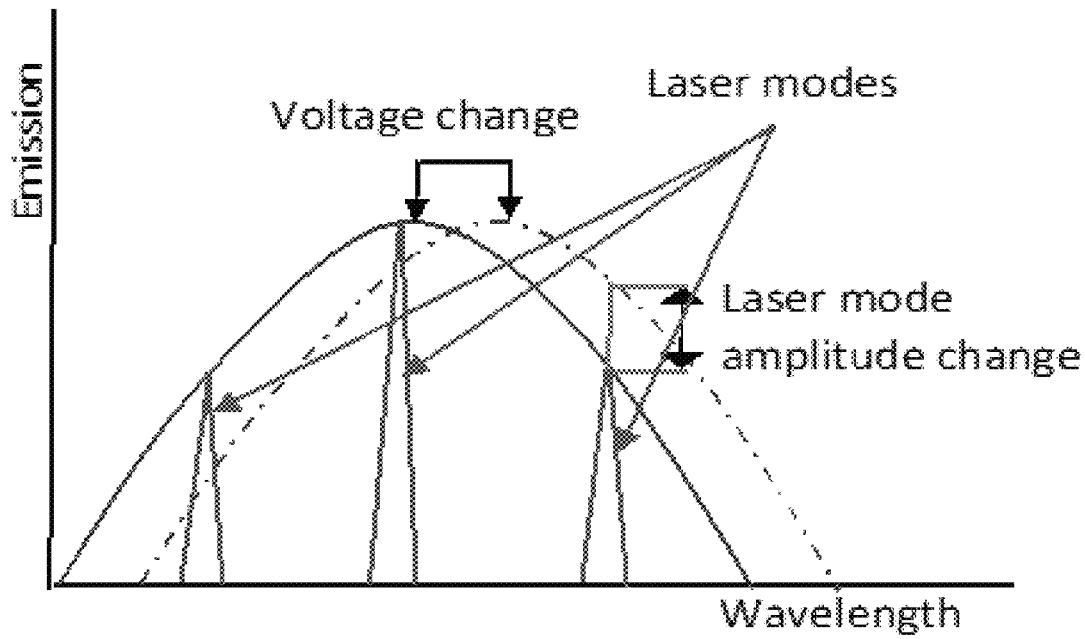
FIG. 4 is a graph showing laser modes emission change due to electric potential effects.
Figure 5A:
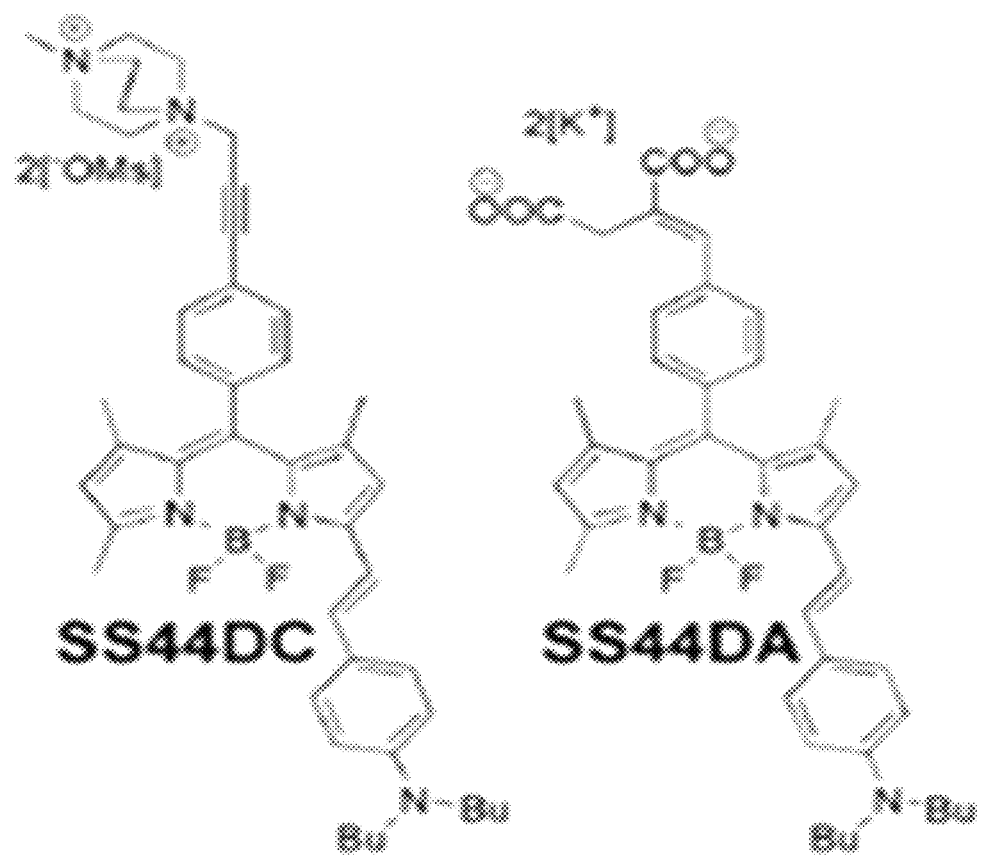
FIG. 5A depicts the structure of two Akita VSDs.
Figure 5B:
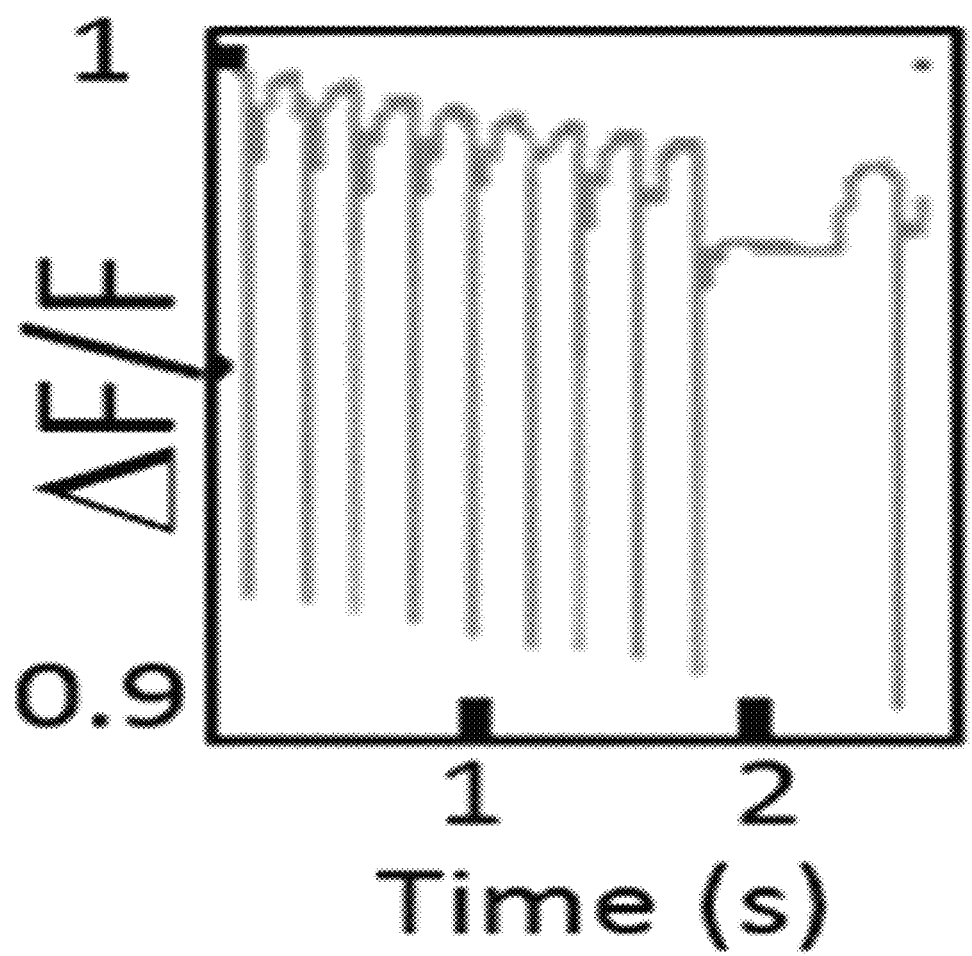
FIG. 5B is a graph of the fluorescence response of SS44DC in phototriggered spiking HEK293 cells, from Q-State passant Biosciences.
Figure 5C:
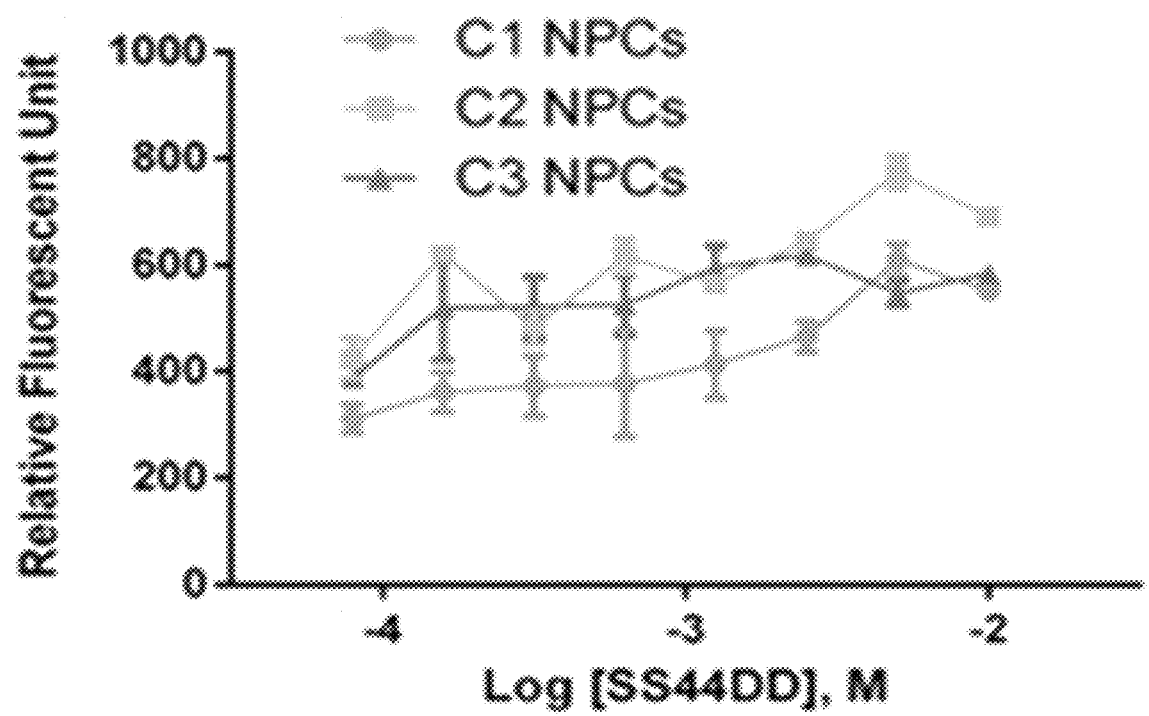
FIG. 5C is a graph of the fluorescence of SS44DC in three different human induced pluripotent stem cells (neuron progenitor cells) after 48 hours of incubation with dye using three different cell lines, showing no evidence of dye cytotoxicity (drop in fluorescence), from Mr. Seok-Man Ho of Mount Sinai Medical Center.
Figure 5D:
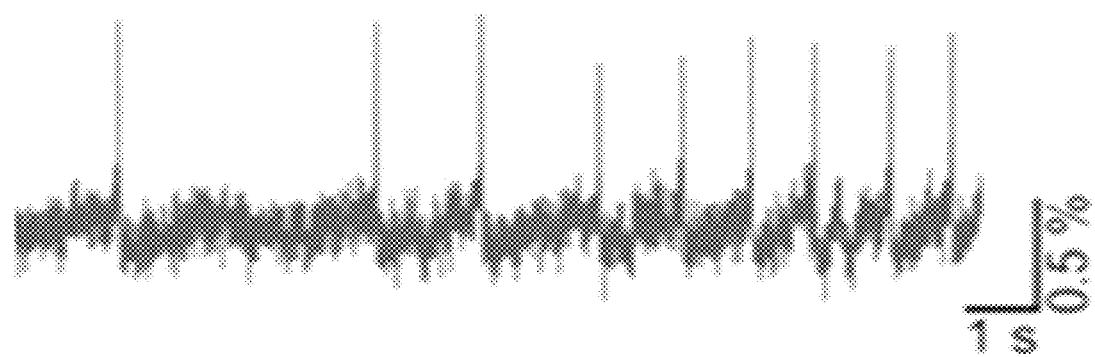
FIG. 5D is a plot of axonal recordings using SS44DC in a nerve of the stomatogastric nervous system of the Jonah crab (Cancer borealis), recorded en without electrical stimulation or pharmacological application, from Chris Goldsmith, School of Biological Sciences, Illinois State University.
Figure 5E:
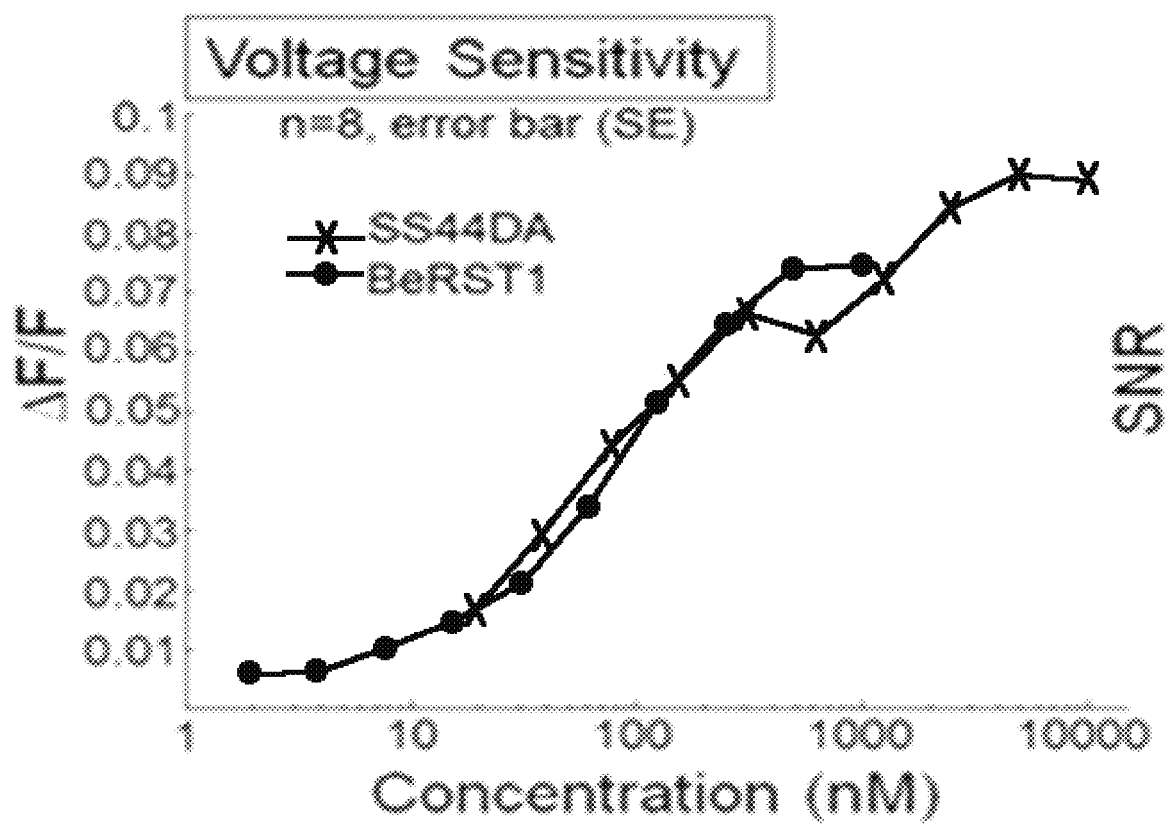
FIGS. 5E-5F depict sensitivity and signal to noise (SNR) of fluorescence of SS44DA compared to the non-commercial VSD BeRST1 in the system used for panel B, also performed by Q-State Biosciences.
Figure 5F:
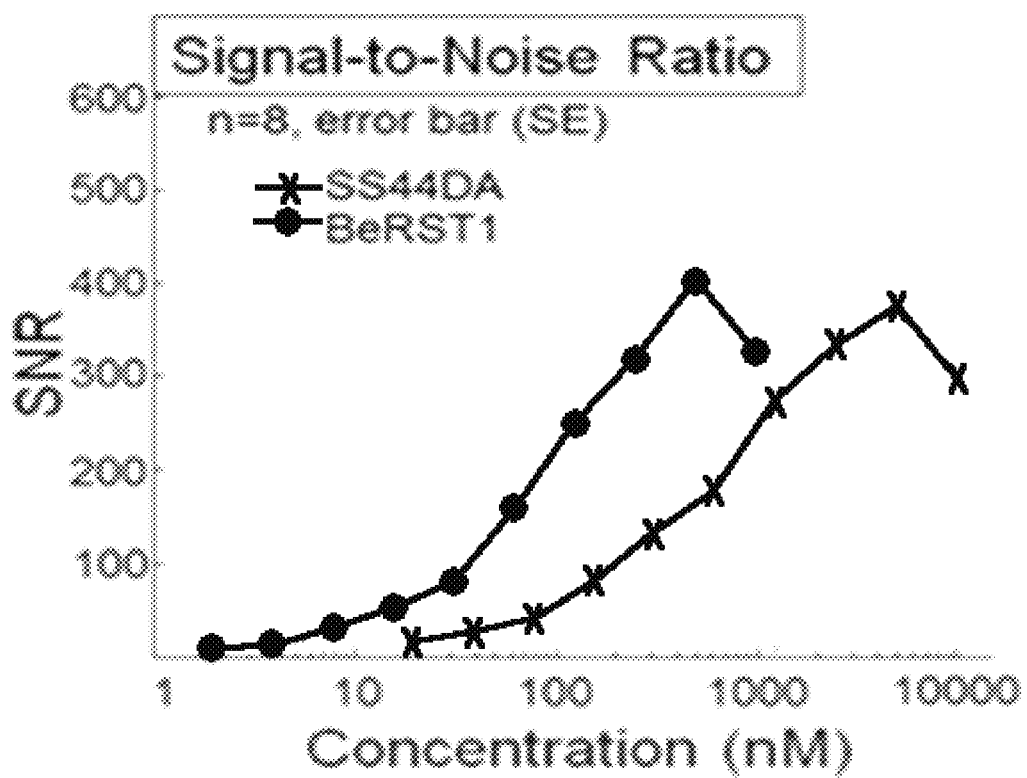
Figure 5G:
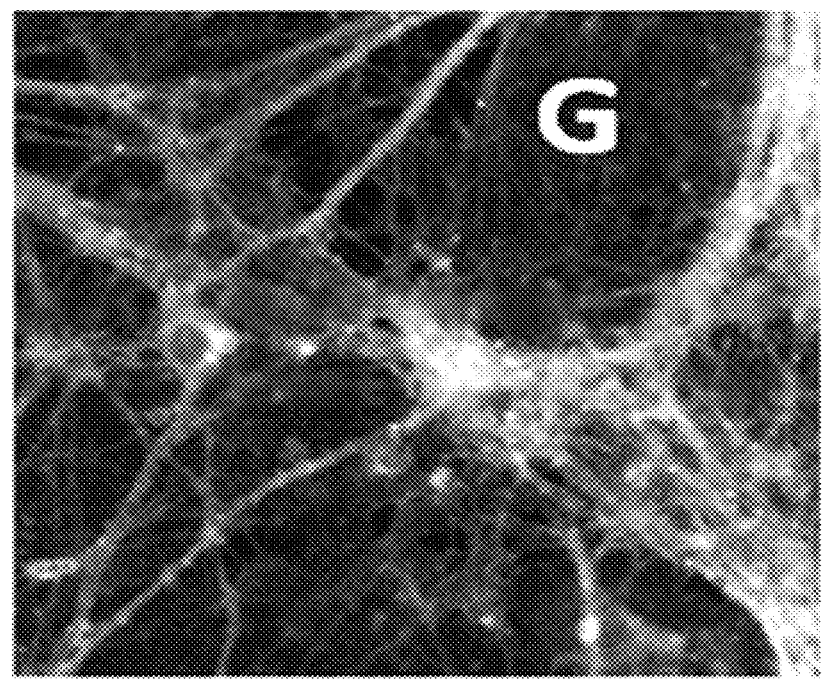
FIG. 5G is a fluorescence microscopic image of cultured neurons with 1600 nm SS44DC incubated for 30 minutes then washed out, taken at 1100 frames per second and excited at 620 nm with detection through a 700 nm bandpass filter.
Figure 5H:
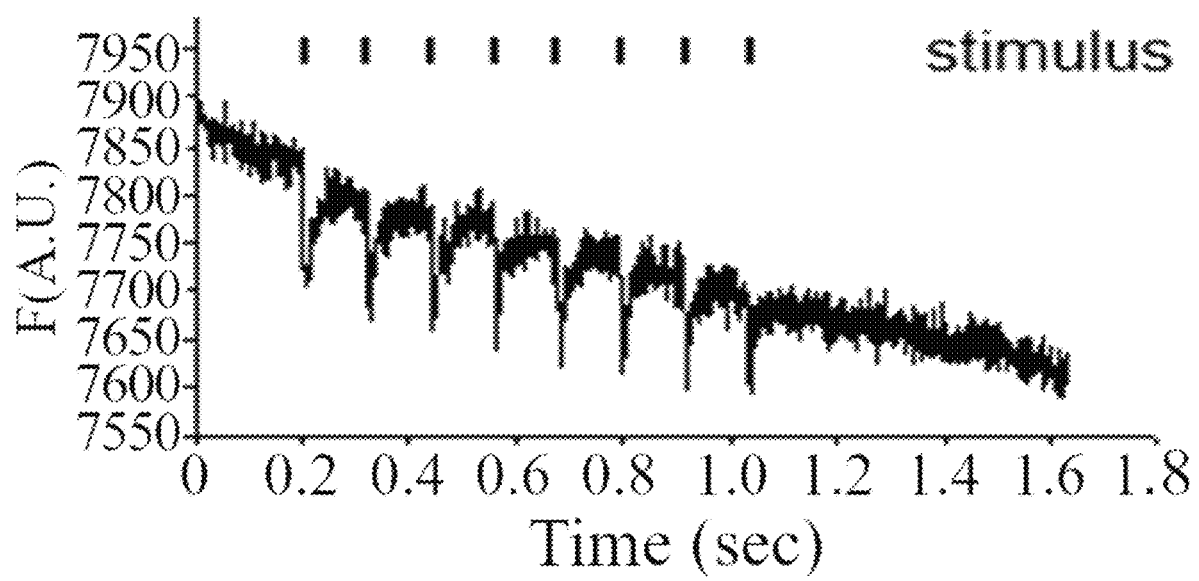
FIG. 5H is a graph of the fluorescence spikes measured from the dye in FIG. 5G, from Doug Kim of the Janelia Institute.
Figure 6A:
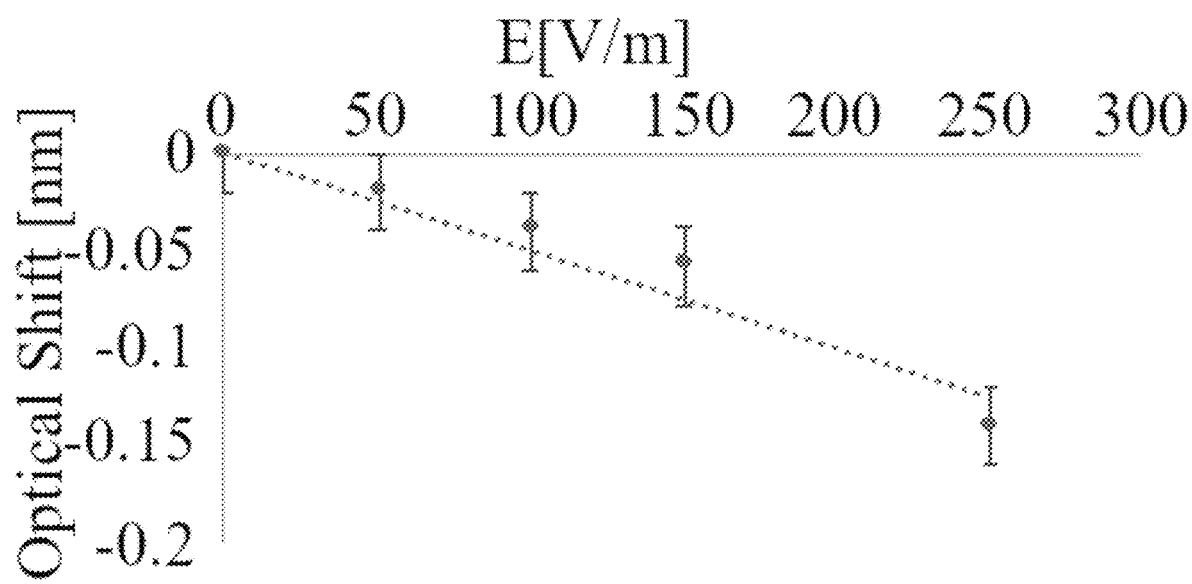
FIG. 6A is a graph of the optical shift as a function of the electric field for a voltage sensitive dye.
Figure 6B:
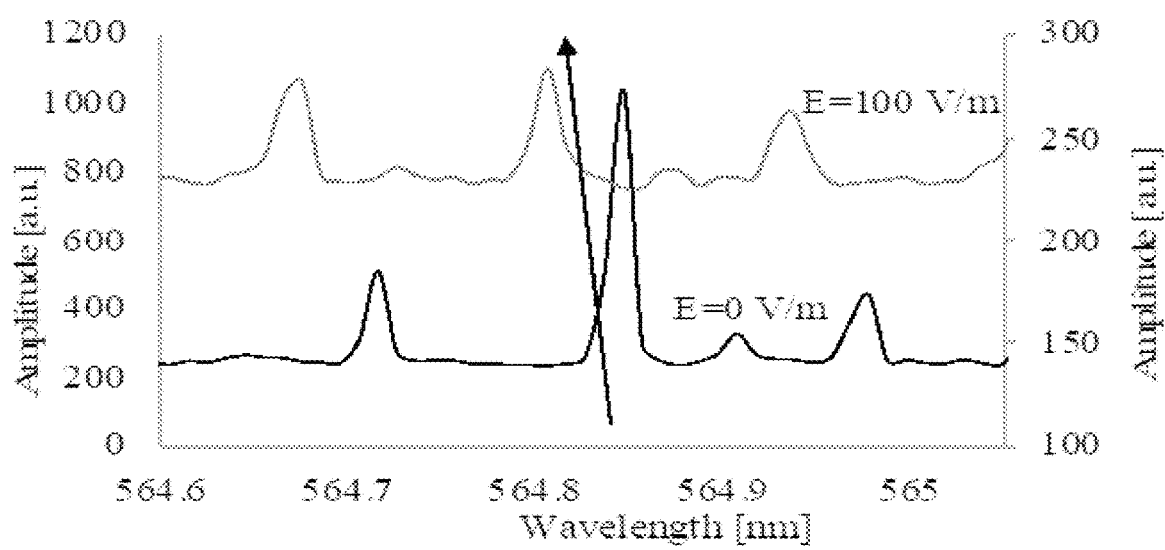
FIG. 6B is a graph of two spectra recorded at different electric field values.
Figure 7A:
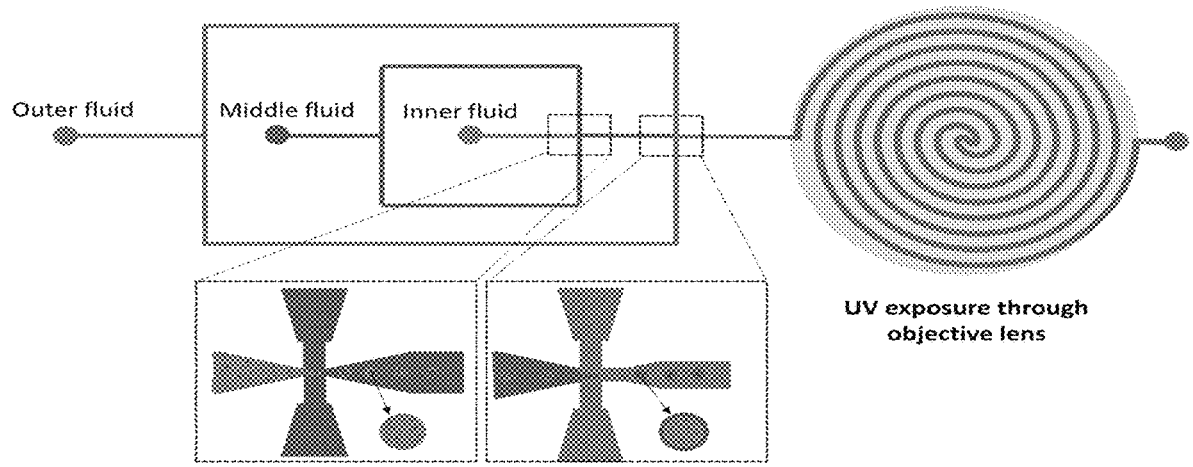
FIG. 7A is a schematic of an exemplary microfluidic device for producing particles of Configuration I as depicted in FIG. 1.
Figure 7B:
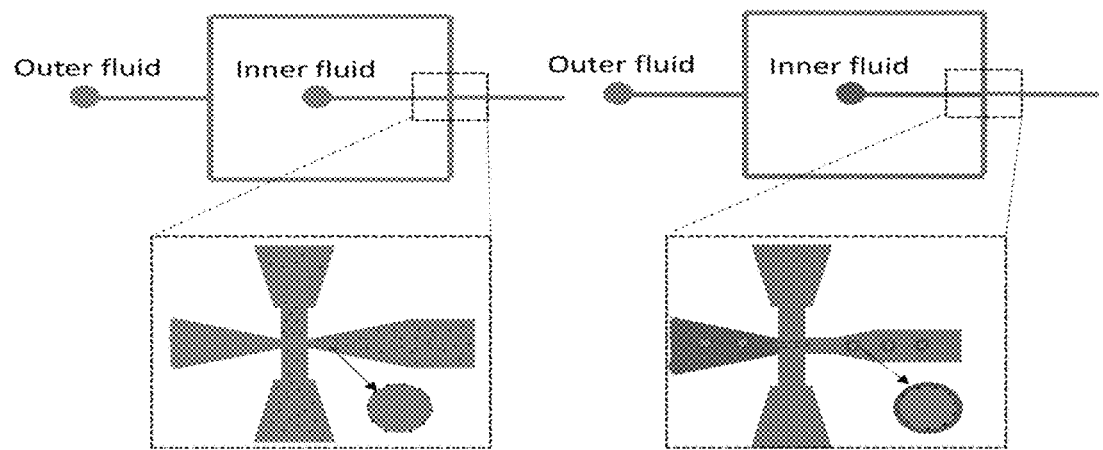
FIG. 7B is a schematic of an exemplary microfluidic device for producing particles of Configuration I as depicted in FIG. 1.
Figure 8A:
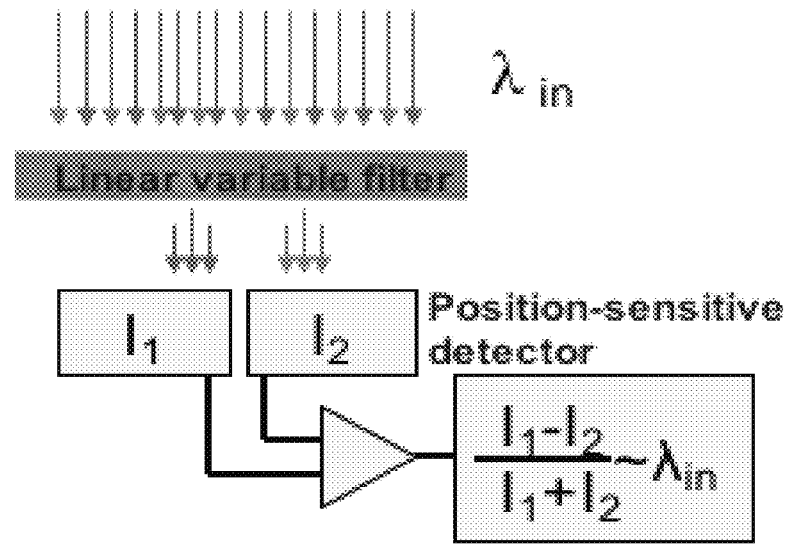
FIG. 8A is a diagram of the wavelengths-shift detection principle: the incoming light is guided onto a linear variable optical band pass filter (LVF) with laterally varying transmission characteristics. The spatial information of the transmitted light spot after the optical filter is proportional to the centroid wavelength $\lambda_{in}$ of the detected light.
Figure 8B:
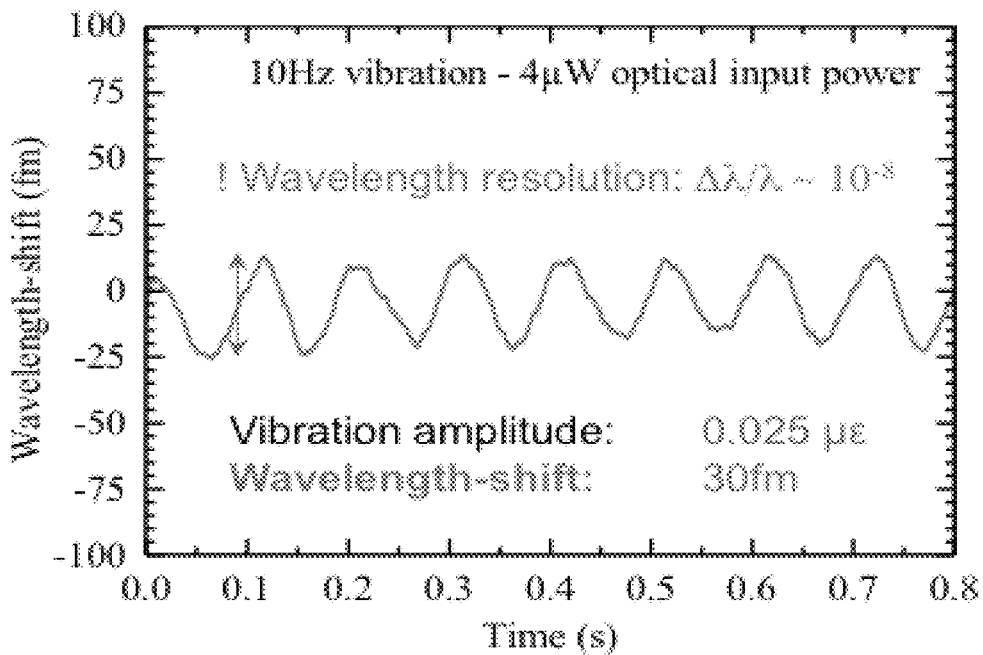
FIG. 8B is a real time vibration signal of an FBG sensor detected with our wavelength shift detector. Strain signals as small as 0.025με which corresponds to wavelength of 30 fm can be clearly resolved.
Figure 8C:
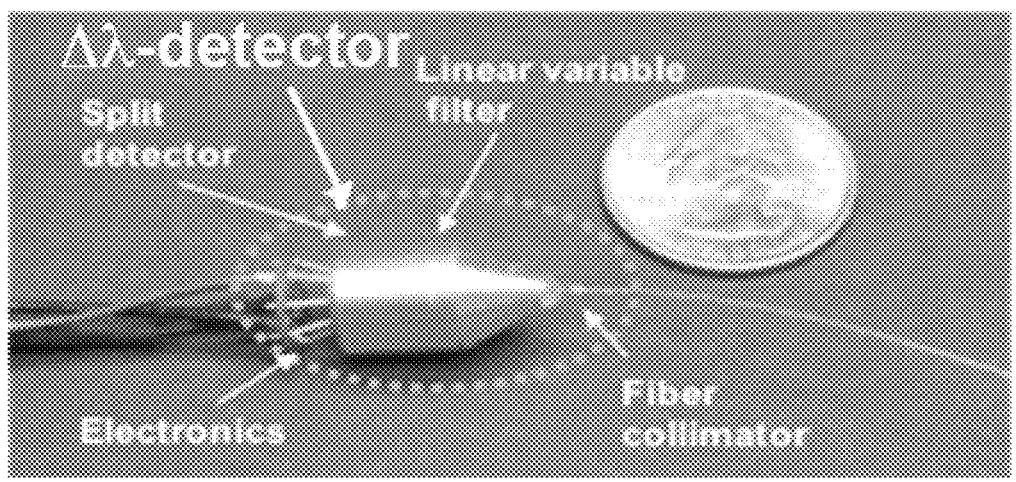
FIG. 8C depicts a prototype of the wavelength detector for FBG strain sensor at 1550 nm (C-band).
Figure 9:
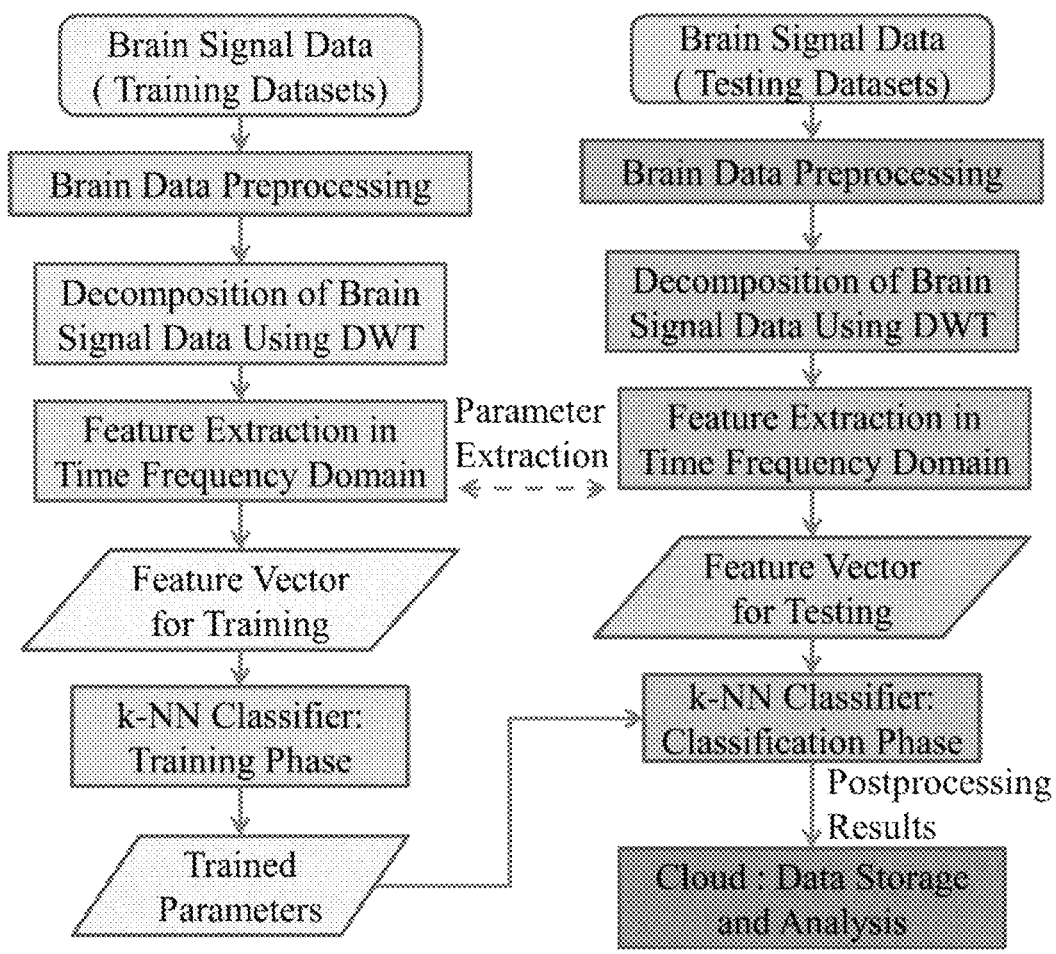
FIG. 9 is an exemplary flow chart of the data acquisition and processing.
Figure 10A:
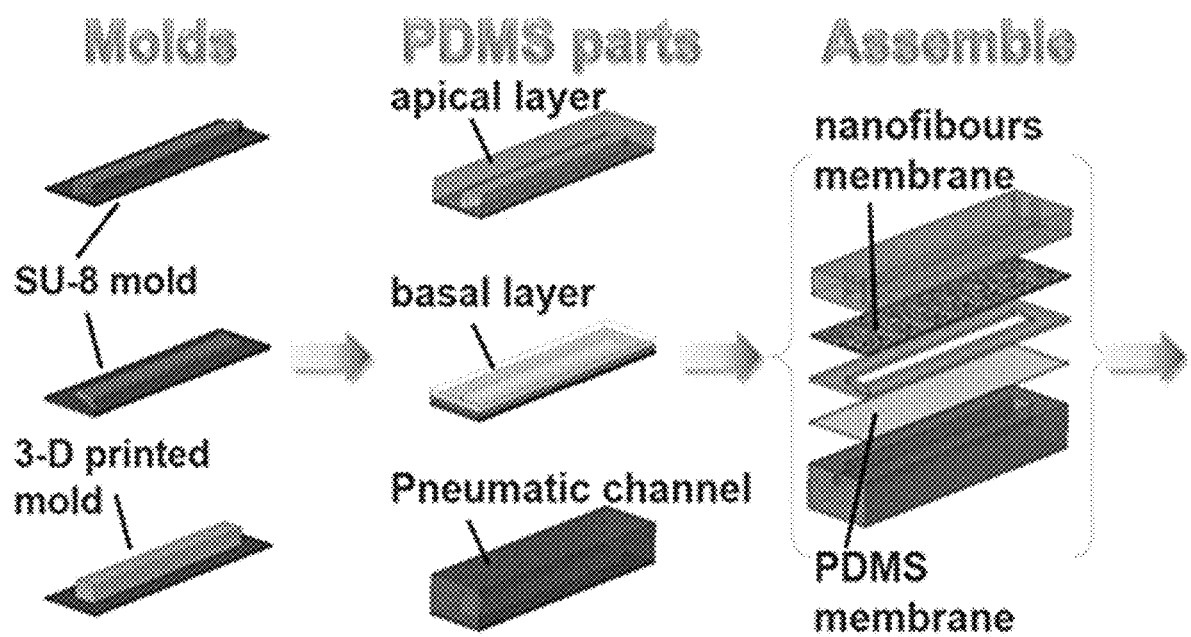
FIG. 10A is a diagram of the design and fabrication of an exemplary BBB chip.
Figure 10B:
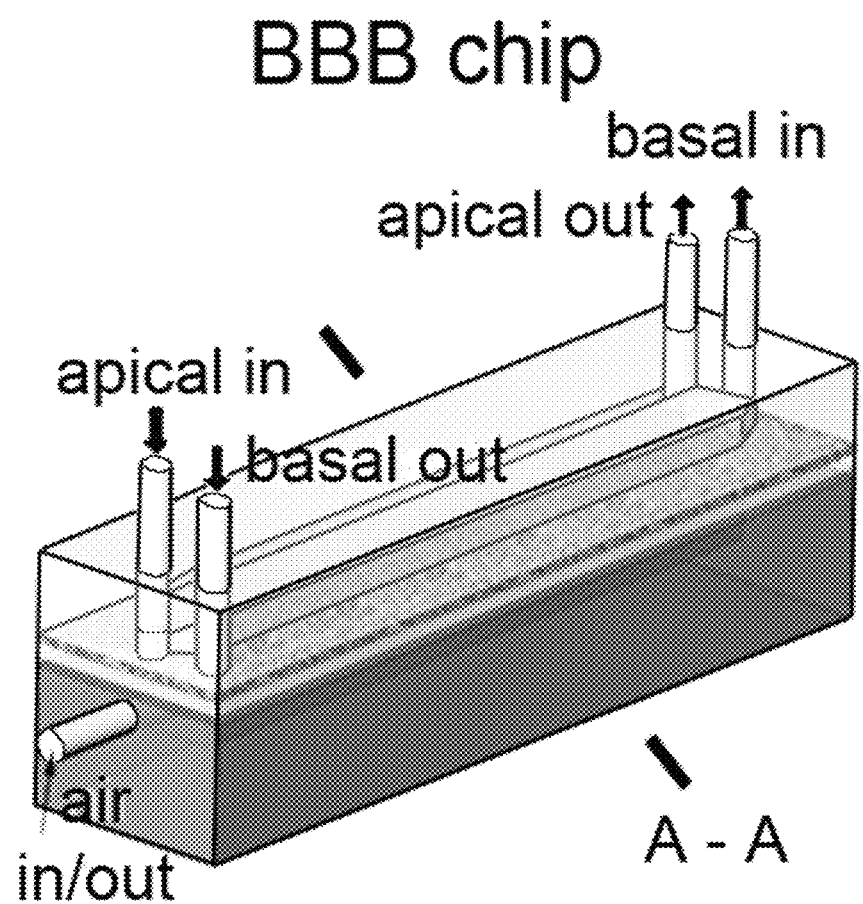
FIG. 10B is a perspective view of the exemplary BBB chip.
Figure 10C:
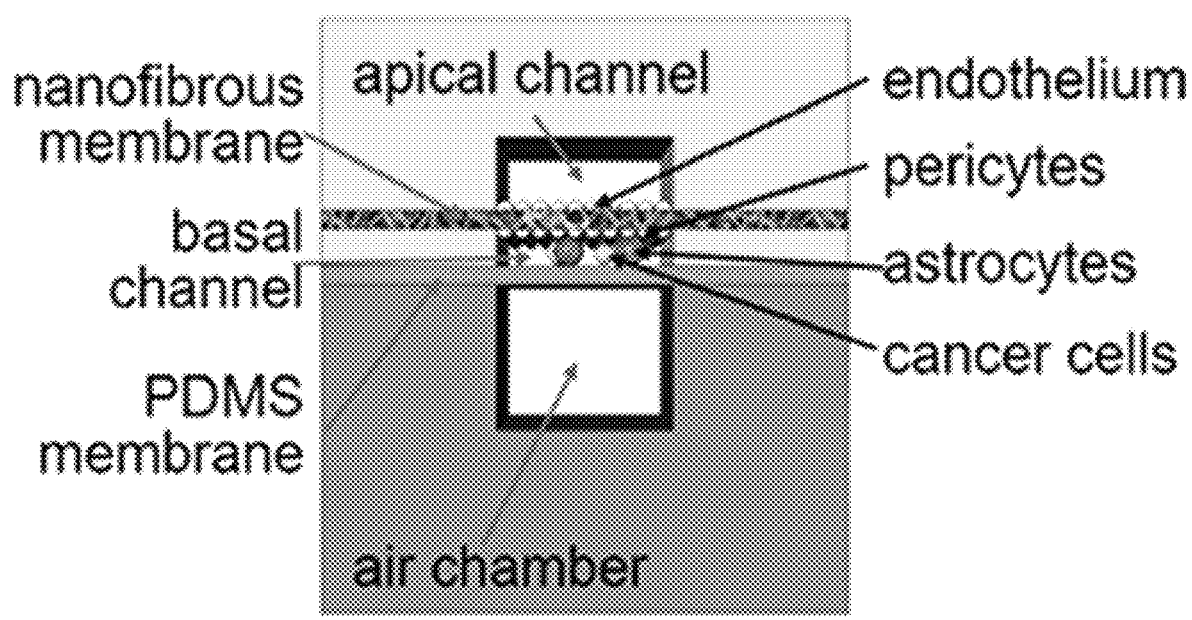
FIG. 10C is a cross-section of A-A in FIG. 10B
Figure 11:
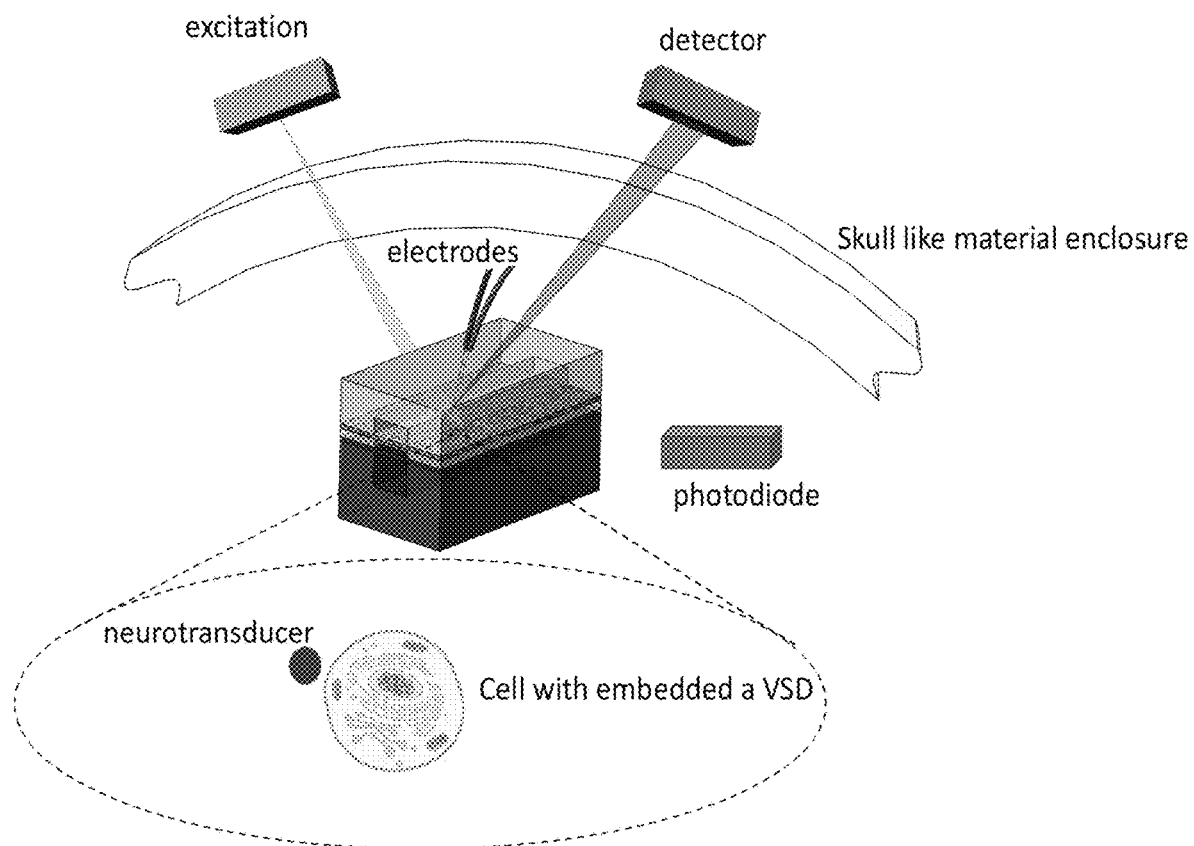
FIG. 11 is a schematic of an exemplary in-vitro experimental setup.

When a voltage sensitive laser dye is chosen, the electrical activity can be monitored by the shift of the emission spectrum of the dye or by a change in the emission amplitude. However, by coupling the optical modes of a dielectric cavity with the laser dye's fluorescence, the amplitude of the optical modes will change due to a variation of the laser dye behavior that can be a shift or an amplitude change (see FIG. 2). Therefore, the lasing threshold energy required to support the laser modes in the particle will change; by monitoring the change in the lasing threshold energy it is possible to measure the electric potential activity of neurons. Due to the fact that the relationship curve between the energy required to form lasing and the output of the laser modes usually exhibit a high slope, the sensitivity and resolution of the proposed system promises to exceed the current state-of-the-art techniques. The development of 3-5 µm sensing particles can be embedded into lipophilic cells; the cells can be injectable through a hypodermal syringe into the blood stream. Due to the capability of this type of cells to pass the brain blood barrier and reach directly the neurons, an in-operando monitoring of brain activity is possible.

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting. The skilled artisan will recognize many variants and adaptations of the embodiments described herein. These variants and adaptations are intended to be included in the teachings of this disclosure and to be encompassed by the claims herein.

All publications and patents cited in this specification are cited to disclose and describe the methods and/or materials in connection with which the publications are cited. All such publications and patents are herein incorporated by references as if each individual publication or patent were specifically and individually indicated to be incorporated by reference. Such incorporation by reference is expressly limited to the methods and/or materials described in the cited publications and patents and does not extend to any lexicographical definitions from the cited publications and patents. Any lexicographical definition in the publications and patents cited that is not also expressly repeated in the instant specification should not be treated as such and should not be read as defining any terms appearing in the accompanying claims. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

Although any methods and materials similar or equivalent to those described herein can also be used in the practice or testing of the present disclosure, the preferred methods and materials are now described. Functions or constructions well-known in the art may not be described in detail for brevity and/or clarity. Embodiments of the present disclosure will employ, unless otherwise indicated, techniques of nanotechnology, organic chemistry, material science and engineering and the like, which are within the skill of the art. Such techniques are explained fully in the literature.

It should be noted that ratios, concentrations, amounts, and other numerical data can be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to about 5%" should be interpreted to include not only the explicitly recited values of about 0.1% to about 5%, but also include individual values (e.g., 1%, 2%, 3%, and 4%) and the sub-ranges (e.g., 0.5%, 1.1%, 2.2%, 3.3%, and 4.4%) within the indicated range. Where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In some embodiments, the term "about" can include traditional rounding according to significant figures of the numerical value. In addition, the phrase "about 'x' to 'y'", where 'x' and 'y' are numerical values, includes "about 'x' to about 'y'".

Unless defined otherwise, all technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

The articles "a" and "an," as used herein, mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used.

The term "biocompatible," as used herein, refers to an ability to be incorporated into a biological system, such as into an organ or tissue of an animal, without stimulating a significant adverse immune or inflammatory response.

Described herein is a human brain-machine interface, capable of stimulating and reading single neuronal activity with high spatial and temporal resolution. Injectable neurotransducers, designed such that only specific neurons are targeted after delivery to the brain. This opens a new avenue in brain/machine interface which does not require surgery and would therefore be suitable for able-bodied individuals. This disclosure described, transducers that can access the brain without surgical procedures to allow healthy people to use next generation human-machine neuronal interfaces. The neurotransducer is based on injectable microparticles that function as optical microlasers, which will serve both to amplify the signal from small molecule voltage sensing fluorophores and to amplify neuron-stimulating light originating outside the skull.

In various aspects, particles are provided that can function as small neurotransmitters in the brain to monitor and/or stimulate electrical activity in the brain of a subject. In some aspects, the particles include a spherical core containing a voltage sensitive fluorescent dye dispersed within a polymer matrix, wherein the polymer matrix has an index of refraction of about 1.2 or greater; an outer surface surrounding the spherical core; and a gold nanoparticle, wherein the gold nanoparticle is on the outer surface, is dispersed within the spherical core, or both.

Suitable voltage sensitive dyes can include, for example, a carbocyanine dye, a rhodamine dye, an oxonol dye, a merocyanine dye, and a combination thereof. In some aspects, the voltage sensitive dye has a structure according to one of the following formulas

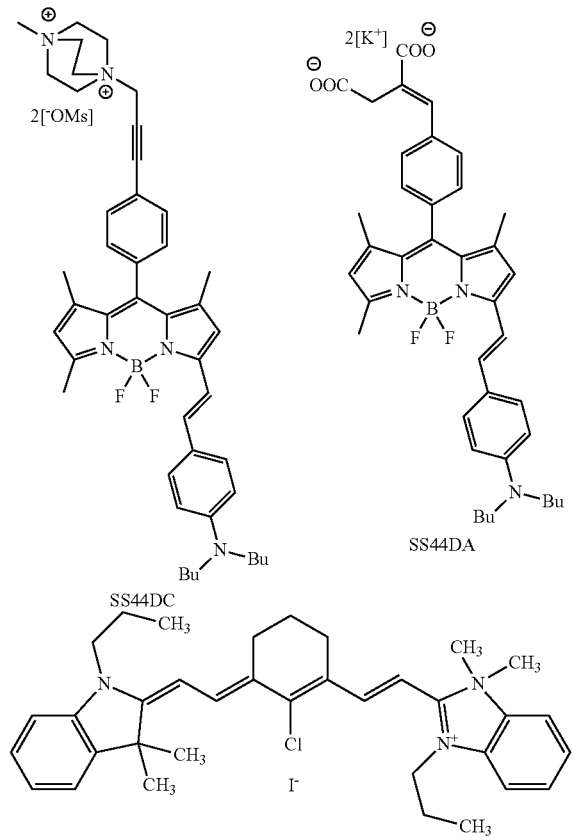

The particles include a polymer matrix. In some aspects, the polymer matrix is a polymer selected from the group consisting of an epoxy, a urethane, a silicone, an acrylic, a cyanoacrylate, and a combination thereof. In some aspects, the polymer matrix is a UV curable polymer matrix.

In some aspects, the amount of the voltage sensitive fluorescent dye and the amount of the polymer matrix must be adjusted. For example, in some aspects, a ratio (m/m) of an amount of the voltage sensitive fluorescent dye to an amount of the polymer matrix is about 2 to about 6.

The particles includes gold nanoparticles. In some aspects, the gold nanoparticles are selected from the group consisting of spherical gold nanoparticles having a diameter of about 100 nm to about 200 nm, gold nanorods having a diameter of about 5 nm to about 25 nm, and a combination thereof. In some aspects, the particles also include a polymer shell encapsulating the spherical core, wherein the gold nanoparticles are in the polymer shell. The polymer shell can include any of the polymers described herein.

In some aspects, the particle has a diameter of about 1 μm to about 10 μm, about 1 μm to about 5 μm, about 1 μm to about 2.5 μm, or about 2.5 μm to about 5 μm.

The particles can exhibits a shift of a laser mode of the particle when exposed to an electric field. In some aspects, the shift is about 0.05 nm to about 0.2 nm for an electric field strength of about 50 V/m to about 200 V/m.

The particles can exhibit a variation of an amplitude of a laser mode of the particle when exposed to an electric field. In some aspects, the variation of the amplitude is about 5% to about 50% for an electric field strength of about 50 V/m to about 200 V/m.

Methods of making the particles are also provided. The methods can include, in a microfluidic device, providing an inner fluid comprising a voltage sensitive dye, a gold nanoparticle, a polymeric precursor, and a polymerization initiator; contacting the inner fluid with a middle fluid via a microfluidic droplet generator to generate a droplet comprising the inner fluid, wherein the droplet is dispersed within the middle fluid; and initiating polymerization of the polymeric precursor by applying one or both of heat and light to form the particle.

In some aspects, the methods include providing an inner fluid comprising a voltage sensitive dye, a polymeric precursor, and a polymerization initiator; contacting the inner fluid with a middle fluid via a microfluidic droplet generator to generate a droplet comprising the inner fluid, wherein the droplet comprises an outer surface and is dispersed within the middle fluid, and wherein the middle fluid comprises a gold nanoparticle and the gold nanoparticle is on the outer surface of the droplet; and initiating polymerization of the polymeric precursor by applying one or both of heat and light to form the particle having the gold nanoparticle on the outer surface. The method can, in some aspects, further include isolating the particle having the gold nanoparticle on the outer surface; providing a second inner fluid comprising a second polymeric precursor and the particle having the gold nanoparticle on the outer surface; contacting the second inner fluid with an outer fluid via a microfluidic droplet generator to generate a second droplet comprising the particle having the gold nanoparticle on the outer surface and surrounded by a layer of the second polymeric precursor, wherein the second droplet is dispersed within the outer fluid; and initiating polymerization of the second polymeric precursor by applying one or both of heat and light to form the particle further comprising a polymer shell formed from the polymerization of the second polymeric precursor.

Pharmaceutical formulations and methods of use are also provided. Pharmaceutical formulations can include an effective amount of the particles and a pharmaceutically acceptable carrier. The methods can include administering the particles or the formulations there to a subject. The methods can, in some aspects, include monitoring an electrical activity in a brain of a subject in need thereof. The methods can, in some aspects, include stimulating an electrical activity in a brain of a subject in need thereof. The methods can include detecting an optical signal external to the subject, wherein the optical signal is a fluorescence emission from the voltage sensitive fluorescent dye that is indicative of a level of electrical activity in a location of the brain near a particle in the plurality of particles. The methods can include administering an optical signal to a location of the brain of the subject using an optical source external to the subject; wherein the optical signal stimulates the voltage sensitive fluorescent dye in a particle in the plurality of particles in the location of the brain of the subject, thereby stimulating an electrical activity in the location.

In some aspects, the subject is a mammal such as a human subject. The location can be highly localized, with resolution down to a single neuron or cluster of neurons. The optical signal can have a wavelength of about 750 nm to about 2000 nm.

For using the polymeric resonators in medical applications, e.g. as neurotransducers in humans, the noisy spectrum from the polymeric resonator may have to be filtered to reduce noise from the presence of higher order modes.

Emission spectrum of optical microlasers are usually noisy and they change due to fluctuation in the excitation light. Here, a spherical rhodamine 6g laser dye doped norland block adhesive (NBA) resonator was used. The laser dye is dissolved in ethanol (concentration of $10^{-3}$M) and a polymer to solution ratio of 2 to 1 was chosen (in volume).

Figure 12:
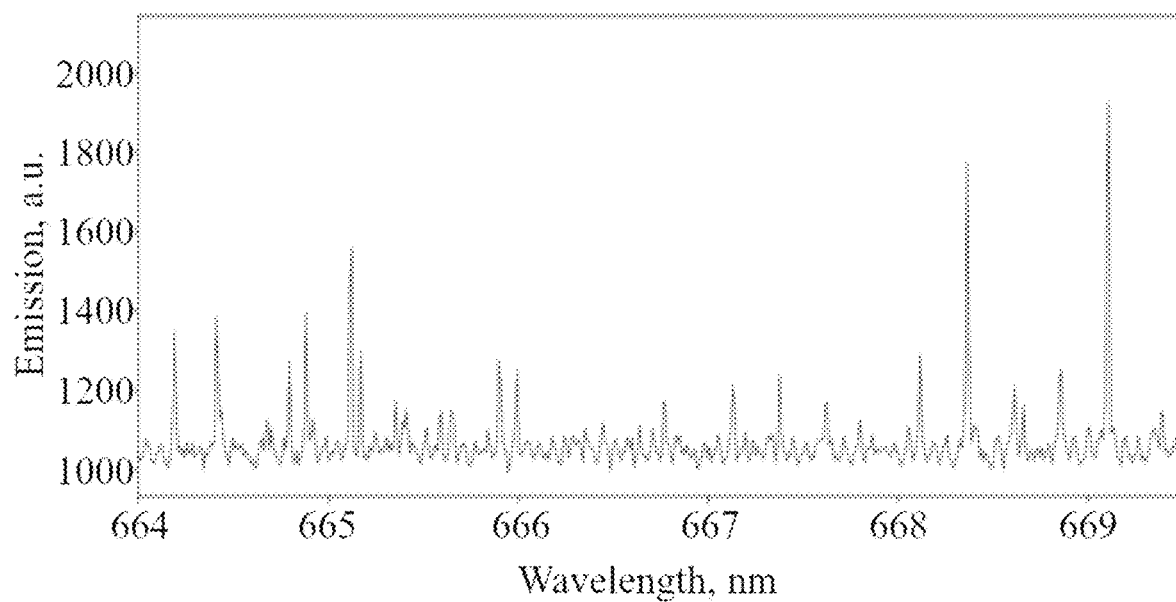
FIG. 12 is a typical emission spectrum from a dye doped dielectric polymer cavity showing the presence of higher order optical modes and some missing first order modes.

A typical emission spectrum from the dye-doped dielectric polymeric cavity is shown in FIG. 12. As the figure shows, some of the first order optical modes are missing and higher order modes are present. These higher order optical modes are borderlines in the lasing threshold and may appear and disappear due to slight changes in the environmental condition and in the excitation light. Also, it is difficult to evaluate the free spectral range (FSR) in this condition. The FSR is the distance between any two consecutive modes of the same order in the emission spectrum. When there are missing peaks and higher order optical modes in the spectrum, it becomes difficult to estimate the FSR which in turns makes the estimation of the MDR shift also difficult. In order to overcome this, an algorithm is presented here.

Figure 13:
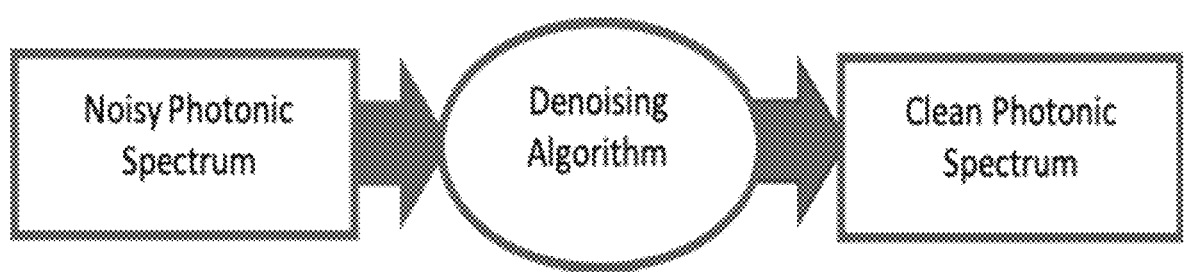
FIG. 13 is a diagram of an exemplary denoising algorithm.

FIG. 13. shows the proposed algorithm schematic; the noisy spectrum is passed to the algorithm and then a clean spectrum is recovered. The denoising algorithm scans the noisy spectrum for any consistent prospective FSR between consecutive peaks among the available optical modes. The most consistent potential FSR has the highest chance of being the accurate FSR provided that the signal to noise ratio is much greater than 1 and it is used to reproduce the missing resonances and eliminate the higher order optical modes. The detailed summary of the algorithm's sequence is shown below:

Pass in the noisy photonic spectrum: inputSpec

Figure 14:
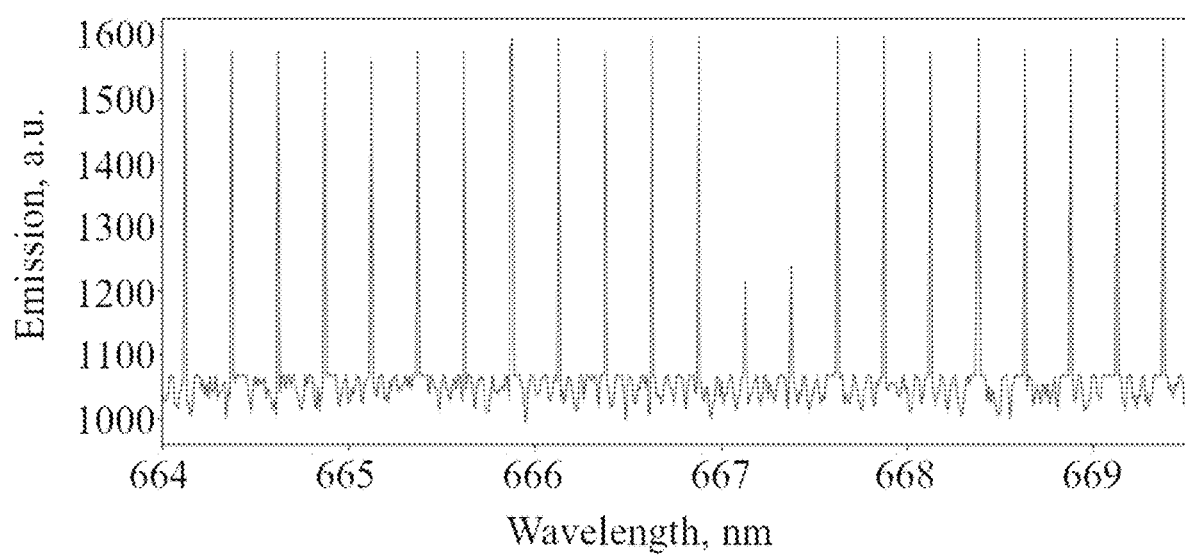
FIG. 14 is a figure depicting the exemplary emission spectrum after having been denoised using the algorithms proposed herein, demonstrating the removal of noise from higher order optical modes and the reconstruction of missing first order modes.

Filter the intensity with the mean intensity and the present optical modes: filteredModes Scan through consecutive optical modes in the filteredModes array for prospective FSRs Store the candidate FSRs and their frequency in an array of pairs: arrayFSR Select the candidate FSR with the most occurrence in arrayFSR as the FSR: trueFSR Detect the starting wavelength with the first two consecutive peaks separated by trueFSR: $\lambda_o$ Reconstruct the missing optical modes and eliminate the false peaks using arrayFSR and $\lambda_o$ Recover a clean photonic spectrum: outputSpec The algorithm has been applied to the spectrum shown in FIG. 12. FIG. 14. shows the emission spectrum which has been filtered from the higher order optical modes; in addition, the missing peaks, belonging to the first order optical modes, were reconstructed. The calculated FSR (~0.25 nm) gives a microlaser diameter of 363 μm which is consistent with the measured diameter of 349 μm (percentage error of ~4%).

It should be emphasized that the above-described embodiments of the present disclosure are merely possible examples of implementations, and are set forth only for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure.

I claim:

1. A particle comprising:
a spherical core comprising one or more fluorescent dyes dispersed within a polymer matrix, wherein the polymer matrix has an index of refraction of about 1.2 or greater;
an outer surface surrounding the spherical core; and
a gold nanoparticle, wherein the gold nanoparticle is on the outer surface, is dispersed within the spherical core, or both.

2. The particle according to claim 1, wherein the one or more fluorescent dyes comprise a voltage sensitive fluorescent dye.

3. The particle according to claim 2, wherein the voltage sensitive fluorescent dye is selected from the group consisting of a carbocyanine dye, a rhodamine dye, an oxonol dye, a merocyanine dye, and a combination thereof.

4. The particle according to claim 2, wherein the voltage sensitive fluorescent dye has a structure according to one of the following formulas

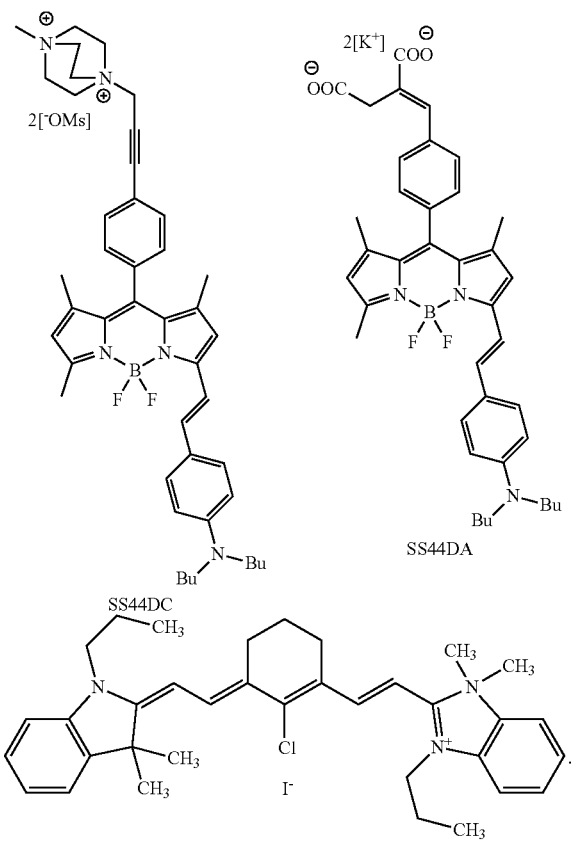

5. The particle according to claim 2, wherein the polymer matrix comprises a polymer selected from the group consisting of an epoxy, a urethane, a silicone, an acrylic, a cyanoacrylate, and a combination thereof.

6. The particle according to claim 2, wherein the polymer matrix is a UV curable polymer matrix.

7. The particle according to claim 2, wherein polymer matrix is biocompatible.

8. The particle according to claim 2, wherein a ratio (v/v) of an amount of the voltage sensitive fluorescent dye to an amount of the polymer matrix is about 2 to about 6.

9. The particle according to claim 2, wherein the particle exhibits a shift of a laser mode of the particle when exposed to an electric field due to a change in a refractive index of the voltage sensitive fluorescent dye used, wherein the shift of the laser mode is about 0.05 nm to about 0.2 nm for an electric field strength of about 50 V/m to about 200 V/m.

10. The particle according to claim 2, wherein the particle exhibits a variation of an amplitude of a laser mode of the particle when exposed to an electric field, wherein the variation of the amplitude is about 5% to about 50% for an electric field strength of about 50 V/m to about 200 V/m.

11. The particle according to claim 1, wherein the gold nanoparticles are selected from the group consisting of spherical gold nanoparticles having a diameter of about 100 nm to about 200 nm, gold nanorods having a diameter of about 5 nm to about 25 nm, and a combination thereof.

12. The particle according to claim 1, wherein the particle has a diameter of about 1 μm to about 10 μm.

13. The particle according to claim 2, wherein the particle further comprises a polymer shell encapsulating the spherical core.

14. The particle according to claim 13, wherein the gold nanoparticles are in the polymer shell.

15. The particle according to claim 13, wherein the polymer shell comprises a polymer selected from the group consisting of an epoxy, a urethane, a silicone, an acrylic, a cyanoacrylate, and a combination thereof.

16. A method of making the particle according to claim 1, the method comprising, in a microfluidic device:
providing an inner fluid comprising a voltage sensitive dye, a gold nanoparticle, a polymeric precursor, and a polymerization initiator;
contacting the inner fluid with a middle fluid via a microfluidic droplet generator to generate a droplet comprising the inner fluid, wherein the droplet is dispersed within the middle fluid; and
initiating polymerization of the polymeric precursor by applying one or both of heat and light to form the particle.

17. The method according to claim 16, wherein the middle fluid comprises a second polymeric precursor and a second polymerization initiator; and
wherein the method further comprises, prior to initiating polymerization, contacting the droplet dispersed within the middle fluid with an outer fluid to form the droplet comprising the inner fluid surrounded by the middle fluid; and
wherein initiating polymerization comprising initiating polymerization of both the polymeric precursor and the second polymeric precursor to form the particle having a polymer shell encapsulating the spherical core.

18. A method of stimulating an electrical activity in a brain of a subject in need thereof, the method comprising:
administering a plurality of the particle according to claim 1 to the subject;
administering an optical signal to a location of the brain of the subject using an optical source external to the subject; wherein the optical signal stimulates the voltage sensitive fluorescent dye in the particle in the location of the brain of the subject, thereby stimulating an electrical activity in the location.

19. The method according to claim 18, wherein the location is a single neuron or a cluster of neurons.

20. The method according to claim 18, wherein the optical signal has a wavelength of about 750 nm to about 2000 nm.

* * * * *